(12) United States Patent
Gao et al.

(10) Patent No.: US 6,730,755 B2
(45) Date of Patent: May 4, 2004

US006730755B2

(54) HALOSULFONIC ACID TREATED CATALYST SUPPORT FOR OLEFIN POLYMERIZATION

(75) Inventors: Xiaoliang Gao, Calgary (CA); P. Scott Chisholm, Calgary (CA); Matthew Gerald Kowalchuk, Calgary (CA); Robert D. Donaldson, Calgary (CA)

(73) Assignee: Nova Chemicals (Internation) S.A (CH)

( * ) Notice: Subject to any disclaimer, the term of this patent is extended or adjusted under 35 U.S.C. 154(b) by 276 days.

(21) Appl. No.: 10/072,375

(22) Filed: Feb. 7, 2002

(65) Prior Publication Data

US 2003/0092563 A1 May 15, 2003

(51) Int. Cl.[7] .............................. C08F 4/64; B01J 31/22; B01J 32/00
(52) U.S. Cl. ..................... 526/129; 502/114; 502/119; 502/120; 502/123; 502/132; 502/135; 502/154; 502/155; 526/129; 526/132; 526/133; 526/153; 526/160; 526/165; 526/943
(58) Field of Search ................. 502/114, 119, 502/120, 123, 132, 135, 154, 155; 526/129, 132, 133, 153, 160, 165, 943

(56) References Cited

U.S. PATENT DOCUMENTS

| | | | |
|---|---|---|---|
| 3,231,550 A | 1/1966 | Manyik et al. | 260/88.2 |
| 4,404,344 A | 9/1983 | Sinn et al. | 526/160 |
| 4,543,399 A | 9/1985 | Jenkins, III et al. | 526/70 |
| 4,808,561 A | 2/1989 | Welborn, Jr. | 502/104 |
| 5,198,401 A | 3/1993 | Turner et al. | 502/155 |
| 5,352,749 A | 10/1994 | DeChellis et al. | 526/68 |
| 5,434,116 A | 7/1995 | Sone et al. | 502/103 |
| 5,554,775 A | 9/1996 | Krishnamurti et al. | 556/7 |
| 5,637,659 A | 6/1997 | Krishnamurti et al. | 526/133 |
| 6,107,230 A * | 8/2000 | McDaniel et al. | 502/104 |
| 6,235,918 B1 * | 5/2001 | Marks et al. | 556/53 |
| 6,300,271 B1 * | 10/2001 | McDaniel et al. | 502/104 |

* cited by examiner

*Primary Examiner*—Caixia Lu
(74) *Attorney, Agent, or Firm*—Kenneth H. Johnson

(57) ABSTRACT

A supported catalyst for olefin polymerization comprises a combination of a novel metal oxide support and an activator which is an aluminoxane or a boron activator. The novel metal oxide support of this invention is a conventional particulate metal oxide support material (such as silica or alumina) which has been treated with a halosulfonic acid. A catalyst system which contains this novel catalyst support and a transition metal catalyst is highly active for olefin polymerization (in comparison to prior art catalyst systems which use a conventional metal oxide support).

13 Claims, No Drawings

HALOSULFONIC ACID TREATED CATALYST SUPPORT FOR OLEFIN POLYMERIZATION

FIELD OF THE INVENTION

This invention relates to catalyst supports which are used for olefin polymerizations, especially ethylene polymerization.

BACKGROUND OF THE INVENTION

The use of an aluminoxane as a cocatalyst for ethylene polymerization catalyst was reported by Manyik et al in U.S. Pat. No. (USP) 3,231,550.

Subsequently, Kamisky and Sinn discovered that aluminoxanes are excellent cocatalysts for metallocene catalysts, as disclosed in U.S. Pat. No. 4,404,344.

The use of a supported aluminoxane/metallocene catalyst is further described in, for example, U.S. Pat. No. 4,808,561.

Hlatky and Turner disclosed the activation of bis-cyclopentadienyl metallocene catalysts with boron activators in U.S. Pat. No. 5,198,401.

We have now discovered that the use of a metal oxide support which has been treated with a halosulfonic acid improves the productivity of group 4 metal catalysts which are activated with an aluminoxane or a boron activator.

SUMMARY OF THE INVENTION

In one embodiment, the present invention provides a catalyst support for olefin polymerization comprising:

1) a treated metal oxide support which is prepared by contacting a particulate metal oxide support with a halosulfonic acid; and
2) an activator selected from the group consisting of an aluminoxane and a boron activator, wherein said activator is deposited upon said treated metal oxide support.

In another embodiment, the present invention also provides a supported olefin polymerization catalyst comprising the above defined catalyst support and a group 4 metal catalyst.

The present invention further provides a process to prepare polyolefins using the catalyst technology of this invention. In a highly preferred embodiment, the group 4 metal catalyst is a phosphinimine catalyst.

DETAILED DESCRIPTION

The use of metal oxide supports in the preparation of olefin polymerization catalysts is known to those skilled in the art. An exemplary list of suitable metal oxides includes oxides of aluminum, silicon, zirconium, zinc and titanium. Alumina, silica and silica-alumina are metal oxides which are well known for use in olefin polymerization catalysts and are preferred for reasons of cost and convenience. Silica is particularly preferred.

The metal oxide may be calcined using conventional calcining conditions (such as temperatures of from 200 to 800° C. for time periods of from 20 minutes to 12 hours).

It is preferred that the metal oxide have a particle size of from about 1 to about 200 microns. It is especially preferred that the particle size be between about 30 and 100 microns if the catalyst is to be used in a gas phase or slurry polymerization process and that a smaller particle size (less than 10 microns) be used if the catalyst is used in a solution polymerization.

Conventional porous metal oxides which have comparatively high surface areas (greater than 1 $m^2/g$, particularly greater than 100 $m^2/g$, more particularly greater than 200 $m^2/g$) are preferred to non-porous metal oxides.

The treated metal oxides used in this invention are prepared by directly treating the metal oxide with a halosulfonic acid such as chlorosulfonic acid or fluorosulfonic acid. Fluorosulfonic acid is readily available and the use thereof is preferred.

Activators

The activator used in this invention is selected from 1) aluminoxanes; and 2) boron activators. It is preferred to use an it aluminoxane. Descriptions of suitable activators are provided below.

Aluminoxanes are readily available items of commerce which are known to be cocatalysts for olefin polymerization catalysts (especially group 4 metal metallocene catalysts). A generally accepted formula to represent aluminoxanes is:

$$(R)_2 AlO(RAlO)_m Al(R)_2$$

wherein each R is independently an alkyl group having from 1 to 8 carbon atoms and m is between 0 and about 50. The preferred aluminoxane is methylaluminoxane wherein R is predominantly methyl. Commercially available methylaluminoxane ("MAO") and "modified MAO" are preferred for use in this invention. [Note: In "modified MAO", the R groups of the above formula are predominantly methyl but a small fraction of the R groups are higher hydrocarbyls—such as ethyl, butyl or octyl—so as to improve the solubility of the "modified MAO" in aliphatic solvents.]

The halosulfonic acid-treated metal oxide and aluminoxane are contacted together to form a catalyst support according to this invention. This is preferably done using conventional techniques such as mixing the aluminoxane and treated metal oxide together in an aliphatic or aromatic hydrocarbon (such as hexane or toluene) at a temperature of from 10 to 200° C. for a time of from 1 minute to several hours. The amount of aluminoxane is preferably sufficient to provide from 1 to 40 weight % aluminoxane (based on the combined weight of the aluminoxane and the treated metal oxide).

Boron Activators

As used herein, the term "boron activator" refers to both boranes and borate salts which function as activators for olefin polymerization catalysts. These activators are well known to those skilled in the art.

The boranes may be generally described by the formula $$B(L)_3$$

wherein B is boron and each L is independently a substituted or unsubstituted hydrocarbyl ligand. Preferred examples of the ligand L include phenyl, alkyl substituted phenyl and halogen-substituted phenyl with perfluorophenyl being particularly preferred.

The borates may be generally described by the formula $$[A][B(L)_4]$$

wherein B is boron and each of the four L ligands is as described above; and

[A] is a carbonium, oxonium, sulfonium or anilinium component of the borate salt. Specific examples of boron activators include:

triethylammonium tetra(phenyl)boron,
tripropylammonium tetra(phenyl)boron,
tri(n-butyl)ammonium tetra(phenyl)boron, trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl) boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenyltrispentafluorophenyl borate,
triphenylmethylium phenyltrispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available ionic activators include:
N,N- dimethylaniliniumtetrakispentafluorophenyl borate,
triphenylmethylium tetrakispentafluorophenyl borate, and
trispentafluorophenyl borane.

The boron activator is preferably used in an equimolar ratio with respect to the transition metal in the catalyst molecule (e.g. if the catalyst is an organometallic complex of titanium, then the B:Ti mole ratio is 1) although the boron activator may be used in lower amounts or in molar excess.

It is also permissible to use a mixture of a boron activation and an aluminoxane.

The metal oxide is preferably (but optionally) also treated with a metal alkyl compound.

As used herein, the term metal alkyl compound is referred to a metal alkyl which may react with surface hydroxyl groups on the preferred silica or alumina supports.

Examples including aluminum, zinc or magnesium complexes having an active alkyl group. Zinc alkyls and magnesium alkyls fall within the scope of this definition as do aluminum complexes which are defined by the formula:

$$Al(R)_a(OR)_b(X)_c$$

Aluminum alkyls (such as tri-isobutyl aluminum) are particularly preferred for resins of cost and convenience. Mixtures of different alkyls such as a mixture of an aluminum alkyl and a magnesium alkyl may also be employed.

The metal oxide may also (optionally) be treated with a bulky amine. As used herein, the term bulky amine refers to an amine having at least one substituent which is bulkier than a methyl group. Readily available amines such as phenyl dimethyl amine (PhNMe$_2$) are preferred.

The resulting catalyst support is suitable for use in olefin polymerization reactions when combined with a polymerization catalyst. Any polymerization catalyst which is activated by an aluminoxane may be employed. Exemplary catalysts include olefin polymerization catalysts which contain group 4 metals (such as Ti, Hf or Zr), group 5 metals (especially V), Fe, Cr and Pd. Preferred catalysts contain a group 4 metal. It is especially preferred to provide an Al:M mole ratio of from 10:1 to 200:1, especially 50:1 to 150:1 in the finished catalyst complex (where Al is the aluminum provided by the aluminoxane and M is the group 4 metal). The catalyst support (i.e. the treated metal oxide/aluminoxane) may be combined with the polymerization catalyst using techniques which are conventionally used to prepare supported aluminoxane/metallocene catalysts. Such techniques are well known to those skilled in the art. In general, a hydrocarbon slurry of the catalyst support may be contacted with the catalyst complex. It is preferred to use a hydrocarbon in which the catalyst complex is soluble. The examples illustrate suitable techniques to prepare the supported catalyst of this invention. Particularly preferred catalysts are group 4 metal catalysts defined by the formula:

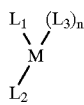

wherein M is selected from titanium, hafnium and zirconium; L$_1$ and L$_2$ are independently selected from the group consisting of cyclopentadienyl, substituted cyclopentadienyl (including indenyl and fluorenyl) and heteroatom ligands, with the proviso that L$_1$ and L$_2$ may optionally be bridged together so as to form a bidentate ligand; L$_3$ (each occurrence) is an activatable ligand and n is 1 or 2. It is preferred that n=2 (i.e. that there are 2 monoanionic activatable ligands).

As previously noted, each of L$_1$ and L$_2$ may independently be a cyclopentadienyl ligand or a heteroatom ligand. Preferred catalysts include metallocenes (where both L$_1$ and L$_2$ are cyclopentadienyl ligands which may be substituted and/or bridged) and monocyclopentadienyl-heteroatom catalysts (especially a catalyst having a cyclopentadienyl ligand and a phosphinimine ligand), as illustrated in the Examples.

Brief descriptions of exemplary ligands are provided below.

Cyclopentadienyl Ligands

L$_1$ and L$_2$ may each independently be a cyclopentadienyl ligand. As used herein, the term "cyclopentadienyl ligand" is meant to convey its broad meaning, namely a substituted or unsubstituted ligand having a five carbon ring which is bonded to the metal via eta-5 bonding. Thus, the term cyclopentadienyl includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of 1) $C_{1-10}$ hydrocarbyl radical (which hydrocarbyl substituents may be further substituted); 2) a halogen atom; 3) a $C_{1-8}$ alkoxy radical; 4) a $C_{6-10}$ aryl or aryloxy radical; 5) an amido radical which is unsubstituted or substituted by up to two $C_{1-8}$ alkyl radicals; 6) a phosphido radical which is unsubstituted or substituted by up to two $C_{1-8}$ alkyl radicals; 7) silyl radicals of the formula —Si—$(R^x)_3$ wherein each $R^x$ is independently selected from the group consisting of hydrogen, a $C_{1-8}$ alkyl or alkoxy radical $C_{6-10}$ aryl or aryloxy radicals; 8) germanyl radicals of the formula Ge—$(R^y)_3$ wherein $R^x$ is as defined directly above.

Activatable Ligands $L_3$ is an activatable ligand. The term "activatable ligand" refers to a ligand which may be activated by a cocatalyst or "activator" (e.g. the aluminoxane) to facilitate olefin polymerization. Exemplary activatable ligands are independently selected from the group consisting of a hydrogen atom, a halogen atom, a $C_{1-10}$ to hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. As previously noted, the preferred catalysts contain a group 4 metal in the highest oxidation state (i.e. 4+) and the preferred activatable ligands are monoanionic (such as a halide—especially chloride, or an alkyl—especially methyl). Thus, the preferred catalyst contains two activatable ligands. In some instances, the metal of the catalyst component may not be in the highest oxidation state. For example, a titanium (III) component would contain only one activatable ligand. Also, it is permitted to use a dianionic activatable ligand although this is not preferred.

Heteroatom Ligands

As used herein, the term "heteroatom ligand" refers to a ligand which contains a heteroatom selected from the group consisting of nitrogen, boron, oxygen, phosphorus and sulfur. The ligand may be sigma or pi bonded to the metal. Exemplary heteroatom ligands include phosphinimine ligands, ketimide ligands, siloxy ligands amido ligands, alkoxy ligands, boron heterocyclic ligands and phosphole ligands. Brief descriptions of such ligands follow:

Phosphinimine Ligands

Phosphinimine ligands are defined by the formula:

wherein each $R^1$ is independently selected from the group consisting of 1) a hydrogen atom; 2) a halogen atom; 3) $C_{1-20}$ hydrocarbyl radicals which are either unsubstituted or substituted by a halogen atom; 4) a $C_{1-8}$ alkoxy radical; 5) a $C_{6-10}$ aryl or aryloxy radical; 6) an amido radical; 7) a silyl radical of the formula:

—Si—$(R^2)_3$ wherein each $R^2$ is independently selected from the group consisting of hydrogen, a $C_{1-8}$ alkyl or alkoxy radical, $C_{6-10}$ aryl or aryloxy radicals; and 8) a germanyl radical of the formula:

Ge—$(R^2)_3$ wherein $R^2$ is as defined above.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

Ketimide Ligands

As used herein, the term "ketimide ligand" refers to a ligand which:

(a) is bonded to the group 4 metal via a metal-nitrogen atom bond;

(b) has a single substituent on the nitrogen atom, (where this single substituent is a carbon atom which is doubly bonded to the N atom); and (c) has two substituents (Sub 1 and Sub 2, described below) which are bonded to the carbon atom.

Conditions a, b, and c are illustrated below:

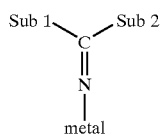

The substituents "Sub 1" and "Sub 2" may be the same or different. Exemplary substituents include hydrocarbyls having from 1 to 20 carbon atoms; silyl groups, amido groups and phosphido groups. For reasons of cost and convenience it is preferred that these substituents both be hydrocarbyls, especially simple alkyls and most preferably tertiary butyl.

Siloxy Heteroligands

These ligands are defined by the formula.

where the—denotes a bond to the transition metal and $\mu$ is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-4}$ hydrocarbyl group such as methyl, ethyl, isopropyl or tertiary butyl (simply because such materials are readily synthesized from commercially available materials).

Amido Ligands

The term "amido" is meant to convey its broad, conventional meaning. Thus, these ligands are characterized by (a) a metal-nitrogen bond, and (b) the presence of two substituents (which are typically simple alkyl or silyl groups) on the nitrogen atom.

Alkoxy Ligands

The term "alkoxy" is also intended to convey its conventional meaning. Thus these ligands are characterized by (a) a metal oxygen bond, and (b) the presence of a hydrocarbyl group bonded to the oxygen atom. The hydrocarbyl group may be a ring structure and/or substituted (e.g. 2,6 di-tertiary butyl phenoxy).

Boron Heterocyclic Ligands

These ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775 and the references cited therein).

Phosphole Ligands

The term "phosphole" is also meant to convey its conventional meaning. "Phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; silyl or alkoxy radicals.

Phosphole ligands are also well known to those skilled in the art of olefin polymerization and are described as such in U.S. Pat. No. 5,434,116 (Sone, to Tosoh).

Polymerization Processes

This invention is suitable for use in any conventional olefin polymerization process, such as the so-called "gas phase", "slurry", "high pressure" or "solution" polymerization processes. Polyethylene, polypropylene and ethylene propylene elastomers are examples of olefin polymers which may be produced according to this invention.

The preferred polymerization process according to this invention uses ethylene and may include other monomers which are copolymerizable therewith such as other alpha olefins (having from three to ten carbon atoms, preferably butene, hexene or octene) and, under certain conditions, dienes such as hexadiene isomers, vinyl aromatic monomers such as styrene or cyclic olefin monomers such as norbornene.

The present invention may also be used to prepare elastomeric co-and terpolymers of ethylene, propylene and optionally one or more diene monomers. Generally, such elastomeric polymers will contain about 50 to abut 75 weight % ethylene, preferably about 50 to 60 weight % ethylene and correspondingly from 50 to 25% of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5vinyl-2-norbornene. Particularly preferred dienes are 5-ethylidene-2-norbornene and 1,4-hexadiene.

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low density polyethylene having density from about 0.910 to 0.935 g/cc. The present invention might also be useful to prepare polyethylene having a density below 0.910 g/cc, the so-called very low and ultra low density polyethylenes.

The catalyst of this invention is preferably used in a slurry polymerization process or a gas phase polymerization process.

A typical slurry polymerization process uses total reactor pressures of up to about 50 bars and reactor temperature of up to about 200° C. The process employs a liquid medium (e.g. an aromatic such as toluene or an alkane such as hexane, propane or isobutane) in which the polymerization takes place. This results in a suspension of solid polymer particles in the medium. Loop reactors are widely used in slurry processes. Detailed descriptions of slurry polymerization processes are widely reported in the open and patent literature.

In general, a fluidized bed gas phase polymerization reactor employs a "bed" of polymer and catalyst which is fluidized by a flow of monomer which is at least partially gaseous. Heat is generated by the enthalpy of polymerization of the monomer flowing through the bed. Unreacted monomer exits the fluidized bed and is contacted with a cooling system to remove this heat. The cooled monomer is then re-circulated through the polymerization zone together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant-and highly undesirable—"reactor chunks"). The obvious way to maintain good mixing and cooling is to have a very high monomer flow through the bed. However, extremely high monomer flow causes undesirable polymer entrainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. Nos. 4,543,399 and 5,352,749. As noted in the '399 reference, it is permissible to use alkanes such as butane, pentanes or hexanes as the condensable fluid and the amount of such condensed fluid preferably does not exceed about 20 weight percent of the gas phase.

Other reaction conditions for the polymerization of ethylene which are reported in the '399 reference are:

Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and Pressure: up to about 1000 psi (with a preferred range of from about 100 to 350 psi for olefin polymerization).

The '399 reference teaches that the fluidized bed process is well adapted for the preparation of polyethylene but further notes that other monomers may be employed—as is the case in the polymerization process of this invention.

Further details are provided by the following non-limiting examples.

EXAMPLES

The following abbreviations are used in the Examples:

| 1. | TIBAL = | triisobutyl aluminum |
|---|---|---|
| 2. | wt % = | weight percent |
| 3. | g = | grams |
| 4. | mmol = | millimol |
| 5. | ~= | approximately |
| 6. | rpm = | revolutions per minute |
| 7. | Ph = | phenyl |
| 8. | Me = | methyl |
| 9. | BEM = | butyl ethyl magnesium |
| 10. | HO$_3$SF = | flurosulfonic acid |
| 11. | psig = | pounds per square inch (gauge) |
| 12. | [C$_2$] = | concentration of ethylene (moles per litre) |
| 13. | tBu = | tertiary butyl |
| 14. | Ind = | indenyl |
| 15. | n-Bu = | normal butyl |
| 16. | Cp = | cyclopentadienyl |
| 17. | ml = | millilitre |

Part A Preparation of Modified Supports

Unless otherwise indicated, the silica supports used in the examples were calcined in two stages:

1) for 2 hours at 200° C. in air; followed by
2) 6 hours at 600° C. under nitrogen.

Example S1

TIBAL (25.2 wt % in heptane, 19.68 g, 25 mmol) was added slowly to a slurry of silica (XPO-2408, previously calcined; 10 g) in heptane (~100 ml) agitated by mechanical overhead stirrer (~140 rpm) at room temperature. The slurry was stirred at room temperature overnight.

The TIBAL treated silica was collected on a frit and rinsed thoroughly with heptane The isolated silica was transferred to a 3-necked round bottom flask and re-slurried in heptane. B(C$_6$F$_5$)$_3$ (0.512 g, 1 mmol) was added as a solution in heptane (~2–3 ml) and the mixture stirred for 10 minutes.

PhNMe$_2$ (0.121 g, 1 mmol) was added to the slurry as a solution in heptane (~2–3 m) and the mixture stirred for an additional 5 minutes.

HO$_3$SF (0.1 g, 1 mmol) diluted in heptane (~2–3 ml) was added to the reaction mixture, and stirring maintained at room temperature overnight.

The modified silica was slightly brown-gray in color with some small black solids present. The product was collected on a frit, rinsed with heptane and dried under vacuum. The isolated silica was stored in a glove box for further use.

Example S2

TIBAL (25.2 wt % in heptane, 19.68 g, 25 mmol) was added slowly to a slurry of silica (XPO-2408, previously calcined; 10 g) in heptane (~100 ml) agitated by mechanical overhead stirrer (~140 rpm) at room temperature. Stirring was maintained overnight.

The TIBAL treated silica was collected on a frit and rinsed thoroughly with heptane. The silica was transferred to a 3-necked round bottom flask and re-slurried in heptane. PhNMe$_2$ (0.606 g, 5 mmol) was added to the slurry as a solution in heptane (~2–3 ml) and the mixture stirred for an additional 10 minutes.

HO$_3$SF (0.5 g, 5 mmol) diluted in heptane (~2–3 ml) was added to the reaction mixture, and stirring maintained at room temperature overnight. Addition of the fluorosulfonic acid induced fuming, and a noticeable darkening of the mixture was observed.

The modified silica was filtered, rinsed with heptane and dried in vacuo. Some brown and black solids were present. The isolated silica was stored in a glove box for further use.

Example S3

PhNMe$_2$ (0.606 g, 5 mmol) as a neat reagent was added to a slurry of silica (XPO-2408, previously calcined; 10 g) pre-treated with TIBAL (25.2 wt % in heptane, 19.68 g, 25 mmol) in heptane (~100 ml) agitated by mechanical overhead stirrer (~290–300 rpm) at room temperature, and the reaction mixture stirred for 25 minutes.

HO$_3$SF (0.5 g, 5 mmol) was added drop-wise as a neat reagent, inducing fuming and a noticeable darkening of the mixture (gray-black tinge) with black solid chunks. Stirring was maintained overnight.

The modified silica was filtered, rinsed with anhydrous heptane and dried under vacuum. The product was sieved (removing ~0.27 g solids) and stored in a glove box for further use (11.4 g).

Example S4

Duplication of S2

Example S5

HO$_3$SF (0.5 g, 5 mmol) was added as a neat reagent to a slurry of silica (XPO-2408, previously calcined; 10 g) pre-treated with BEM (19.9 wt % in heptane, 13.88 g, 25 mmol) in heptane (~125 ml) agitated by mechanical overhead stirrer (~200 rpm) at room temperature, inducing fuming. The reaction mixture was then stirred for 24 hours.

The yellow slurry was filtered, rinsed with anhydrous heptane and dried under vacuum. The pale yellow silica was sieved and stored in a glove box for further use (12.04 g).

Example S6

PhNMe$_2$ (0.606 g, 5 mmol) was added as a neat reagent to a slurry of silica (XPO-2408, previously calcined; 10 g) pre-treated with BEM (19.9 wt % in heptane, 13.88 g, 25 mmol) in heptane (~125 ml) agitated by mechanical overhead stirrer (~200 rpm) at room temperature. The reaction mixture was stirred 20 minutes, and then HO$_3$SF (0.5 g, 5 mmol) was added as a neat reagent. Mild fuming was observed. The slurry was stirred for an additional 23 hours.

The beige mixture was filtered, rinsed with anhydrous heptane and dried under vacuum. The product was too fluffy for sieving, so it was isolated as is and stored in a glove box for further use (12.63 g).

Example S7

TIBAL (25.2 wt % in heptane, 19.68 g, 25 mmol) was added slowly to a slurry of silica (XPO-2408, previously calcined; 10 g) in heptane (~100 ml) agitated by mechanical overhead stirrer (~140 rpm) at room temperature. The slurry was stirred at room temperature over a weekend.

The TIBAL treated silica was collected on a frit and rinsed thoroughly with heptane. The mostly dry silica was transferred to a 3-necked round bottom flask and re-slurried in heptane. HO$_3$SF (0.5 g, 5 mmol) diluted in heptane (~2–3 ml) was added drop-wise to the reaction mixture and stirring maintained at room temperature overnight. The reaction mixture assumed a deep yellow coloration.

The olive green reaction mixture (with black solids present) was filtered, rinsed with anhydrous heptane and dried under vacuum. The isolated pale yellow silica was stored in a glove box for further use (~10–11 g).

Example S8

$SiO_2$ (XPO-2408, previously calcined; 10 g), pre-treated with PMAO-IP (12.9% Al; MT-1097-32-89) was slurried in anhydrous toluene (~100 ml) by mechanical overhead stirrer. Then solid [$PhNMe_2H$][$O_3SF$] (1.11 g, 5 mmol made by mixing $PhNMe_2$ and $HO_3SF$ in heptane) was added slowly, and the reaction mixture stirred at ~330 rpm over the weekend.

The slurry was green-blue, and all salt chunks had dispersed. The solid was collected on a frit, rinsed with anhydrous toluene and dried under vacuum. The modified silica was stored in a glove box for further use (10.6 g).

Example S9

Silica (XPO-2408, previously calcined; 10 g) pre-treated with TIBAL (25.2 wt % in heptane, 19.68 g, 25 mmol) and [$PhNMe_2H$][$O_3SF$] (1.11 g, 5 mmol) were combined as solids in a 3-necked round bottom flask. Anhydrous toluene (~125 ml) was added, and the slurry agitated by mechanical overhead stirrer (~300 rpm) at room temperature. Stirring of the slightly beige reaction mixture was maintained overnight.

The slurry was heated at 60° C. for an additional 22.5 hours with stirring.

The modified silica was cooled to room temperature, filtered and rinsed with anhydrous heptane, and dried under vacuum. The product was sieved (removing 0.02 g solids) and stored in a glove box for further use (11.6 g).

Example S10

$HO_3SF$ (3.0 g, 30 mmol) was added drop-wise to a slurry of silica (a commercially available silica, purchased from W. R. Grace under the tradename "XPO-2408" and previously calcined; 10 g) in anhydrous heptane (~100 ml) agitated by overhead mechanical stirrer (~250 rpm). The reaction mixture was stirred at room temperature for several hours, and stirring decreased to ~150 rpm overnight. The slurry was a very deep yellow-orange suspension.

The brown-black solid was collected by frit, and washed thoroughly with heptane and dried under vacuum. The olive green fluorosulfated silica was stored in a glove box for further use.

Example S11

$PhNMe_2$ (0.606 g, 5 mmol) as a solution in anhydrous heptane (~2–3 ml) was added to a slurry of silica (XPO-2408, previously calcined; 10 g) pre-treated with TIBAL (25.2 wt % in heptane, 19.68 g, 25 mmol) in heptane (~100 ml) agitated by mechanical overhead stirrer (~210 rpm) at room temperature, and the reaction mixture stirred for 15 minutes.

$CF_3SO_3H$ (0.750 g, 5 mmol) diluted in heptane (~2–3 ml) was added drop-wise to the reaction mixture, inducing fuming. Stirring was maintained overnight.

The slurry was observed to have a yellowish coloration concentrated at the bottom of the reaction vessel. Filtration was undertaken, the solid rinsed with anhydrous heptane and dried under vacuum. The white silica was sieved, removing some white solids, and stored in a glove box for further use (11.4 g).

Example S12

TIBAL (25.2 wt % in heptane, 31.51 g, 40 mmol) was added rapidly to a slurry of aluminum oxide (activated, basic, Brockmann I, purchased from Sigma-Aldrich and previously calcined; 10 g) in anhydrous heptane (~125 ml) agitated by mechanical overhead stirrer (~300 rpm) at room temperature. Within 5–10 minutes of addition of the TIBAL, there was an observable thickening of the reaction mixture. Stirring was maintained for ~68 hours.

The TIBAL treated aluminum oxide was collected on a frit and rinsed thoroughly with heptane. The mostly dry aluminum oxide was transferred to a 3-necked round bottom flask and re-slurried in heptane. $PhNMe_2$ (0.606 g, 5 mmol) was added drop-wise to the slurry as a neat reagent and stirring maintained for an additional 30 minutes.

$HO_3SF$ (0.5 g, 5 mmol) was added to the reaction mixture as a neat reagent, and stirring maintained at room temperature overnight. Addition of the fluorosulfonic acid induced fuming, and a noticeable beige-brown coloration of the mixture was observed.

After ~24 hours stirring, the modified aluminum oxide was filtered, rinsed with heptane and dried in vacuo. The isolated product was sieved (removing ~0.04–0.05 g solids) and stored in a glove box for further use (10.9 g). The solid has a non-uniform beige-brown coloration.

Example S13

Duplication of S2.

Part B Preparation of Supported Catalysts

Part B.1 Preparation of Catalyst Component

General procedure: Toluene was deoxygenated and dried (through columns of alumina, deoxo catalyst and activated molecular sieves under nitrogen) prior to use. Unless otherwise specified, the toluene and other solvents (e.g. heptane) are dried and deoxygenated this way. The support material, namely silica "XPO-2408" for comparative examples or modified support for the inventive examples was weighted into a 100 ml flask and toluene was added to make a slurry. A solution of methylaluminoxane (a commercially available material, sold under the tradename "PMAO-IP" by Akzo Nobel) of 12% weight aluminum was added to the slurry while the slurry was stirred with a mechanical stirrer or with a minimum stirring speed with a magnetic stirrer.

Part B.2 Preparation of Supported Catalyst Systems

The catalyst component slurry from Part 1 was stirred for 16 hours, which was filtered to remove the supernatant, and the solid was re-slurried into toluene.

A solution of a catalyst complex (sufficient to provide an Al:Ti or Al:Zr molar ratio of approximately 120:1) was added slowly to the slurry. The combined mixture was stirred for 2 hours at room temperature and an additional 2 hours at 45° C. The catalyst system solids were recovered by filtration and washed with small amounts of toluene for 3 times. The catalyst was dried under vacuum and sieved.

Part C Polymerization of Ethylene

General Procedures: All polymerization work was conducted by using a 2 litre, stirred, autoclave reactor running in a gas phase mode of operation. Polymerizations were conducted at 80 to 90° C. under a total reaction pressure of 200 psig. A seed bed of dry NaCl (160 g) was used. A specified amount of 25% solution of tri-isobutyl aluminum (TIBAL) was used as a poison scavenger. Some copolymerizations were studied by injecting hexene (5 ml or 10 ml) and/or hydrogen into the reactor.

After the addition of scavenger (and comonomer), ethylene was used to push the catalyst system into the reactor and to bring the reactor pressure to the total pressure of 200 psig. General polymerization conditions are summarized in Table 1.

TABLE 1

Polymerization Reactor Operating Conditions

| | |
|---|---|
| Solvent | 5 ml hexane added with catalyst |
| Operating Mode | Gas phase |
| Seed Bed | 160 g NaCl |
| Catalyst Charge | Ranges between 10–35 mg |
| Alkyl Scavenger | 25 weight % TIBAL in hexane (Akzo-Nobel) |
| Al (from alkyl scavenger):M | 250:1 |
| Ethylene | 0.4351–0.5174 molar |
| Hydrogen | 0–0.4 molar |
| Comonomer | 0–0.019 molar hexene |
| Reaction Pressure | 200 psig |
| Reaction Temperature | 90° C. |
| Reaction Time | 60 minutes |

The results of polymerization runs (Examples 1 to 36) are collected in Table 2

Example 1—Comparative

The catalyst was made by supporting PMAO-IP (Akzo-Nobel) and $(tBu_3PN)(Ind)TiCl_2$ on calcined silica (XPO-2408, calcined at 200° C. for 2 hours under air and 600° C. for 6 hours under $N_2$) with a titanium loading of 0.037 mmol/g. The ratio of Al:Ti was 120:1. 35 mg of such catalyst produced 26 g of polyethylene. The activity of the catalyst was 39,812 gPE/mmolTi[$C_2$]hr.

Example 2

The catalyst was made by supporting PMAO-IP and $(tBu_3PN)(Ind)TiCl_2$ on support S1. The titanium loading was 0.037 mmol/g and the ratio of Al:Ti was 120:1. 13 mg of such catalyst produced 10 g of polyethylene. The activity of the catalyst was 41,225 gPE/mmolTi[$C_2$]hr.

Example 3

The catalyst was made by supporting PMAO-IP and $(tBu_3PN)(Ind)TiCl_2$ on support S2. The loading of titanium was 0.037 mmol/g. 30 mg of such a catalyst resulted in run-away reaction. The polymerization had to be quenched.

Examples 4 and 5

The same catalyst as in Example 3 was used. But the amount was reduced to 11 mg. In both cases, the temperature excursion was too high. No meaningful activity was obtained.

Example 6

The catalyst was made in the same way as in Example 2, but the loading of the titanium was reduced to 0.019 mmol/g. 10 mg of this catalyst was used and the run was very smooth. 32 g of polyethylene was obtained. The activity was 333,970 gPE/mmolTi[$C_2$]hr.

Example 7

6 mg of the catalyst in Example 6 was used. Copolymerization with 5 ml of 1-hexene produced 32 g of polymers. The activity was 604,569 gPE/mmolTi[$C_2$]hr.

Examples 8 and 9

Similar to Example 7, but 5 psi of hydrogen was added to the reactor. Activities of 80,766 and 118,764 gPE/mmolTi[$C_2$]hr were obtained.

Example 10

The support was made to duplicate S2. This support (S3) was used to make a catalyst similar to the one in Example 6. 11 mg of the catalyst was used and 33 g of polyethylene was produced. The activity was 313,096 gPE/mmolTi[$C_2$]hr.

Examples 11 and 12

The support was re-made again. This support (S4) was used to make a catalyst similar to the one in Example 6 and in Example 10. The polymerization was carried out in another reactor. The activities obtained were 286,000 and 211,442 gPE/mmolTi[$C_2$]hr.

Examples 13 and 14

Support S5 was made reacting the calcined silica with butyl ethyl magnesium (BEM). The loading of Ti was 0.037mmol/g. The activities obtained were 120,611 and 96,347 gPE/mmolTi[$C_2$]hr.

Examples 15 and 16

Support S6 was used to make the supported catalyst. The activities were 118,366 and 111,256 gPE/mmolTi[$C_2$]hr.

Examples 17 to 21

The support (S7) was made by using substantially the same procedures which were used to prepare support S2 except that the $PhNMe_2$ was omitted. The catalyst made by using S7 was still very active but not as active as the ones made by using S2, S3 or S4. See Table 2.

Examples 22 and 23—Comparative

Silica supported PMAO-IP was modified by reacting with $[PhNHMe_2][FSO_3]$. That is, no further aluminoxane was added after the $[PhNHMe_2][FSO_3]$. This support was used to support the titanium catalyst. The activities for the two runs were only 6,431 and 10,886 gPE/mmolTi[$C_2$]hr.

Example 24

Support S9 which was made by reacting TIBAL treated silica with $[PhNHMe_2][FSO_3]$. The catalyst made with this support had an activity of 63,824 gPE/mmolTi[$C_2$]hr.

Example 25

32 mg of the catalyst made by using support S10 was used. The polymerization temperature increased very rapidly so the experiment was repeated (Example 26) with a lower concentration of titanium catalyst.

Example 26

The amount of catalyst was reduced from 32 mg to 10 mg. A smooth run was obtained. The catalyst activity was calculated to be 107,186 gPE/mmolTi[$C_2$]hr.

Examples 27 and 28

S11 was used to make the supported catalyst. Catalyst activities for these two randomized runs were found to be 66,794 and 72,012 gPE/mmolTi[$C_2$]hr.

Example 29

The catalyst made by using S12 had an activity of 53,530 gPE/mmolTi[$C_2$]hr only.

Example 30

Comparative $(n-BuCp)_2ZrCl_2$ was supported on calcined XPO-2408. The catalyst activity was found to be 28,422 gPE/mmolZr[$C_2$]hr.

Example 31

$(n\text{-BuCp})_2\text{ZrCl}_2$ was supported on S4 with Zr loading of 0.05 mmol/g. 42 mg of the catalyst produced 89.8 g of polyethylene. The catalyst activity was 84,795 gPE/mmolZr $[C_2]$hr.

Example 32

Repeat of Example 31.

Example 33 and 34

The catalyst $(\text{Ind})(t\text{-Bu}_3\text{P=N})\text{TiMe}_2$ (loading: 0.037 mmol/g support) was mixed in toluene with $B(C_6F_5)_3$ with a ratio of 1:3. The solution was then added to a slurry of the support S3 in toluene. The slurry was stirred for 1 hour and was pumped to dryness. The solid catalyst was sieved prior to use. The activity is reported in Table 2.

Example 35

The support S3 was mixed with $B(C_6F_5)_3$ (0.111 mmol/g support) and was stirred mechanically overnight. The catalyst $(\text{Ind})(t\text{-Bu}_3\text{P=N})\text{TiMe}_2$ (loading: 0.37 mmol/g support) was then added. The mixture was stirred for 1 hour and was pumped to dryness. The activity for ethylene polymerization is shown in Table 2.

Example 36—Comparative

The catalyst $(\text{Ind})(t\text{-Bu}_3\text{P=N})\text{TiMe}_2$ was mixed with $B(C_6F_5)_3$ in toluene with a ratio of 1:3. The solution was added to calcined XPO-2408 silica treated with TIBAL. The mixture was pumped to dryness. The polymerization result is shown in Table 2.

TABLE 2

Polymerization Activity Results

| Example | Support | Support Code | Catalyst Loading (mmol/g support) | Weight of Catalyst (mg) | Hexene (ml) | Hydrogen (psi) | Weight of Polymer (g) | Activity (gPE/mmolTi)[C2]hr |
|---|---|---|---|---|---|---|---|---|
| 1 | $SiO_2$ | XPO-2408 | 0.037 | 35 | 0 | 0 | 26 | 39,812 |
| 2 | $SiO_2$ + $B(C_6F_5)_5$ + $PhNMe_2$ + $FSO_3H$ | S1 | 0.037 | 13 | 0 | 0 | 10 | 41,225 |
| 3 | $SiO_2$ TIBAL + $PhNMe_2$ + $FSO_3H$ | S2 | 0.037 | 30 | 0 | 0 | 40 | Too hot, quenched |
| 4 | $SiO_2$ TIBAL + $PhNMe_2$ + $FSO_3H$ | S2 | 0.037 | 11 | 0 | 0 | 38 | 185,140 still too hot |
| 5 | $SiO_2$ TIBAL + $PhNMe_2$ + $FSO_3H$ | S2 | 0.037 | 11 | 0 | 0 | 26 | 126,674 too hot |
| 6 | $SiO_2$ TIBAL + $PhNMe_2$ + $FSO_3H$ | S2 | 0.019 | 10 | 0 | 0 | 32 | 333,970 |
| 7 | $SiO_2$ TIBAL + $PhNMe_2$ + $FSO_3H$ | S2 | 0.019 | 6 | 5 | 0 | 32 | 604,569 |
| 8 | $SiO_2$ TIBAL + $PhNMe_2$ + $FSO_3H$ | S2 | 0.019 | 8 | 5 | 5 | 5.7 | 80,766 |
| 9 | $SiO_2$ TIBAL + $PhNMe_2$ + $FSO_3H$ | S2 | 0.019 | 15 | 5 | 5 | 15.7 | 118,764 |
| 10 | $SiO_2$ TIBAL + $PhNMe_2$ + $FSO_3H$ | S3 repeat S2 | 0.019 | 11 | 0 | 0 | 33 | 313,096 |
| 11 | $SiO_2$ TIBAL + $PhNMe_2$ + $FSO_3H$ | S4 repeat S2 | 0.019 | 20.9 | 0 | 0 | 59 | 286,000 |
| 12 | $SiO_2$ TIBAL + $PhNMe_2$ + $FSO_3H$ | S4 | 0.019 | 7.7 | 0 | 0 | 15.6 | 211,442 |
| 13 | $SiO_2$ BEM + $FSO_3H$ | S5 | 0.037 | 28 | 0 | 0 | 63.4 | 120,611 |
| 14 | $SiO_2$ BEM + $FSO_3H$ | S5 | 0.037 | 8.9 | 0 | 0 | 16 | 96.347 |
| 15 | $SiO_2$ BEM + $PhNMe_2$ + $FSO_3H$ | S6 | 0.037 | 16.3 | 0 | 0 | 36 | 118,366 |
| 16 | $SiO_2$ BEM + $PhNMe_2$ + $FSO_3H$ | S6 | 0.037 | 7.9 | 0 | 0 | 16.4 | 111,256 |
| 17 | $SiO_2$ TIBAL + $FSO_3H$ | S7 | 0.037 | 25 | 0 | 0 | 39 | Too hot |
| 18 | $SiO_2$ TIBAL + $FSO_3H$ | S7 | 0.037 | 9 | 0 | 0 | 31 | Still too hot 184,598 |
| 19 | $SiO_2$ TIBAL + $FSO_3H$ | S7 | 0.019 | 10 | 0 | 0 | 18.8 | 196,207 |
| 20 | $SiO_2$ TIBAL + $FSO_3H$ | S7 | 0.019 | 16 | 0 | 0 | 7.2 | 46,964 |
| 21 | $SiO_2$ TIBAL + $FSO_3H$ | S7 | 0.019 | 35 | 0 | 0 | 29 | 86,474 |
| 22 | $SiO_2$ PMAO-IP + $[PhNHMe_2][FSO_3]$ | S8 | 0.037 | 10 | 0 | 0 | 1.2 | 6,431 |
| 23 | $SiO_2$ PMAO-IP + $[PhNHMe_2][FSO_3]$ | S8 | 0.037 | 32 | 0 | 0 | 6.5 | 10,886 |
| 24 | $SiO_2$ TIBAL + $[PhNHMe_2][FSO_3]$ | S9 | 0.037 | 11 | 0 | 0 | 13.1 | 63,824 |
| 25 | $SiO_2$ + $FSO_3H$ | S10 | 0 037 | 32 | 0 | 0 | 24 | 40,194 |
| 26 | $SiO_2$ + $FSO_3H$ | S10 | 0.037 | 10 | 0 | 0 | 20 | 107,186 |
| 27 | $SiO_2$ TIBAL + $PhNMe_2$ + $CF_3SO_3H$ | S11 | 0 019 | 15 | 0 | 0 | 9.6 | 66,794 |
| 28 | $SiO_2$ TIBAL + $PhNMe_2$ + $CF_3SO_3H$ | S11 | 0.019 | 10 | 0 | 0 | 6.9 | 72,012 |
| 29 | $Al_2O_3$ TIBAL + $PhNMe_2$ + $FSO_3H$ | S12 | 0.037 | 17 | 0 | 0 | 17 | 53,53 |
| 30 | XPO-2408 $SiO_2$ | Untreated $SiO_2$ | 0.1 | 30 | 0 | 0 | 43 | 28,422 |
| 31 | $SiO_2$ TIBAL + $PhNMe_2$ + $FSO_3H$ | S13 | 0.05 | 42 | 0 | 0 | 89.8 | 84,795 |
| 32 | $SiO_2$ TIBAL + $PhNMe_2$ + $FSO_3H$ | S13 | 0.05 | 29 | 0 | 0 | 57.5 | 78,634 |
| 33 | $SiO_2$ TIBAL + $PhNMe_2$ + $FSO_3H$ | S3 | 0.037 | 32 | 0 | 0 | 18.9 | 31,653 |
| 34 | $SiO_2$ TIBAL + $PhNMe_2$ + $FSO_3H$ | S3 | 0.037 | 47 | 0 | 0 | 23 | 26,226 |
| 35 | $SiO_2$ TIBAL + $PhNMe_2$ + $FSO_3H$ | S3 | 0.037 | 30 | 0 | 0 | 28 | 50,020 |
| 36 | $SiO_2$ TIBAL | untreated | 0.0423 | 29 | 0 | 0 | 6.1 | 9,621 |

Note:
The organometallic catalyst is $(\text{Ind})(t\text{-Bu}_3\text{PN})\text{TiCl}_2$ unless otherwise specified.
Co-catalyst is PMAO-IP. The molar ratio of Al:Ti is 120:1 if Ti loading is 0.037 mmol/g, or Al:Ti = 240:1 if Ti loading is 0.019 mmol/g (occasionally 120:1 was used).
In Examples 30, 31 and 32, the catalyst is $(n\text{-BuCp})_2\text{ZrCl}_2$.
"Too hot" means that an extreme temperature rise was observed.

What is claimed is:

1. A catalyst support for olefin polymerization comprising:
   1) a treated metal oxide support which is prepared by contacting a particulate metal oxide support with a halosulfonic acid; and
   2) an activator selected from the group consisting of an aluminoxane and a boron activator, wherein said activator is deposited upon said treated metal oxide support.

2. The catalyst support of claim 1 which further comprises an aluminum complex of the formula:

$$Al(R)_a(OR)_b(X)_c$$

wherein R is a hydrocarbyl group;

OR is an alkoxide;

X is a halide;

with the proviso that (i) a+b+c=3 and (ii) a≧1.

3. The catalyst support of claim 2 wherein said aluminum complex is a trialkyl aluminum.

4. The catalyst support of claim 3 wherein said aluminum complex is triisobutyl aluminum.

5. The catalyst support of claim 1 which further comprises a bulky amine.

6. The catalyst support of claim 5 wherein said bulky amine is phenyl dimethyl amine.

7. The catalyst support of claim 1 wherein said particulate metal oxide support is silica having an average particle size of from 20 to 200 microns.

8. The catalyst support of claim 1 wherein said aluminoxane is (methyl) aluminoxane.

9. The catalyst support of claim 1 wherein said halosulfonic acid is fluorosulfonic acid.

10. A supported catalyst comprising the catalyst support of claim 1 and a transition metal catalyst.

11. The supported catalyst of claim 10 wherein said transition metal catalyst is an organometallic complex of a group 4 metal.

12. The supported catalyst of claim 11 wherein said organometallic complex of a group 4 metal is defined by the formula:

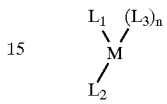

wherein M is selected from titanium, hafnium and zirconium; $L_1$ and $L_2$ are independently selected from the group consisting of cyclopentadienyl, substituted cyclopentadienyl (including indenyl and fluorenyl) and heteroatom ligands, with the proviso that $L_1$ and $L_2$ may optionally be bridged together so as to form a bidentate ligand; $L_3$ (each occurrence) is an activatable ligand and n is 1 or 2.

13. A process for the preparation of linear low density polyethylene which comprises contacting ethylene and at least one $C_{3-8}$ alpha olefin under polymerization conditions in the presence of the supported catalyst of claim 10.

* * * * *